(12) United States Patent
Yeh et al.

(10) Patent No.: US 7,439,490 B2
(45) Date of Patent: Oct. 21, 2008

(54) READING-LINE ADJUSTING DEVICE OF IMAGE SCANNER

(75) Inventors: Ming Te Yeh, Taipei (TW); Yun Hsiu Ou, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 161 days.

(21) Appl. No.: 11/097,177

(22) Filed: Apr. 4, 2005

(65) Prior Publication Data

US 2006/0039043 A1    Feb. 23, 2006

(30) Foreign Application Priority Data

Aug. 20, 2004    (TW)    ................. 093125270

(51) Int. Cl.
*H04N 1/04* (2006.01)

(52) U.S. Cl. ..................... 250/234; 358/474

(58) Field of Classification Search ................. 250/234; 358/474
See application file for complete search history.

(56) References Cited

U.S. PATENT DOCUMENTS

| 6,809,451 B1* | 10/2004 | Brown ................... 310/156.08 |
| 2003/0169463 A1* | 9/2003 | Sheng et al. ................ 358/474 |
| 2005/0270592 A1* | 12/2005 | Lian et al. ................... 358/474 |

* cited by examiner

*Primary Examiner*—Georgia Y. Epps
*Assistant Examiner*—Tony Ko
(74) *Attorney, Agent, or Firm*—Bacon & Thomas, PLLC

(57) ABSTRACT

A reading-line adjusting device of an image scanner includes an image sensing module, a shaft, a bush member, and a fixing and adjusting member. The image sensing module has a reading line for sensing an electronic signal of an image. The shaft is arranged in a first direction. The bush member includes a base and a bushing body. The base is coupled with the image sensing module. The bushing body is sleeved around the shaft and moved along the shaft. The fixing and adjusting member is used for fixing the base of the bush member onto the image sensing module and adjusting an angle between the base and the image sensing module such that the reading line of the image sensing module is arranged in a second direction.

20 Claims, 5 Drawing Sheets

READING-LINE ADJUSTING DEVICE OF IMAGE SCANNER

FIELD OF THE INVENTION

The present invention relates to a reading-line adjusting device of an image scanner, and more particularly to a reading-line adjusting device capable of adjusting the reading line direction of an image sensing module of the image scanner.

BACKGROUND OF THE INVENTION

With increasing development, electronic products are more powerful and the sizes thereof are developed toward minimization. In addition to these requirements, the electronic product should have desired quality. For example, scanners are widely used for scanning, opaque objects and processing the image information into analog, or digital forms. Examples of the opaque objects include paper sheets, photographs, etc. In order to achieve better image quality, the components of the scanner should be properly selected and assembled. As known, the type of the light source and the brightness of the reflective light are major factors influencing the image quality of the scanner.

A typical scanner comprises an image sensing module in the lower housing, thereof. The image sensing, module has therein several optical elements including a light source, a reflective mirror, a lens set, and an image sensor such as a charge couple device (CCD). When the scanner is operated, the light emitted by the light source is projected onto an opaque object placed on a scanning, platform, which is typically a glass platform. The light reflected from the scanned object is incident into the image sensing module and reflected by the reflective mirror. By means of the lens set, the light reflected from the reflective mirror is focused on the charge-couple device (CCD) and converted into an electric signal in an analog or digital form.

Referring to FIG. 1, a conventional CCD image sensing module is illustrated. The image sensing module 7 comprises a bush member 8 located at a side thereof. The bush member 8 is integrally formed with the image sensing module 7. The bush member 8 is movably coupled to a shaft 9. By means of some transmission elements such as a transmission drive belt (not shown), the image sensing module 7 is moved in the scanning direction along the shaft 9 so as to realize the image data of the document or picture.

Ideally, the scanning direction of the image sensing module 7 is parallel to the length of the shaft 9, and the reading line of the image sensing module 7 is perpendicular to the scanning direction. Sometimes, however, the reading line direction is deviated from the ideal direction due to an inherent fit tolerance between the image sensing module 7 and the shaft 9. Therefore, the scanning quality is impaired.

In views of the above-described disadvantages resulted from the conventional method, the applicant keeps on carving unflaggingly to develop a reading-line adjusting device of an image scanner according to the present invention through wholehearted experience and research.

SUMMARY OF THE INVENTION

It is an object of the present invention to provide a reading-line adjusting device capable of adjusting the reading line direction of an image sensing module to be substantially perpendicular to the scanning direction, thereby minimizing the adverse influence resulting from the reading line direction's deviation.

In accordance with a first aspect of the present invention, there is provided a reading-line adjusting device of an image scanner. The reading-line adjusting device comprises an image sensing module, a shaft, a bush member, and a fixing and adjusting member. The image sensing module has a reading line for sensing an electronic signal of an image. The shaft is arranged in a first direction. The bush member comprises a base and a bushing body. The base is coupled with the image sensing module. The bushing body is sleeved around the shaft and moved along the shaft. The fixing and adjusting member is used for fixing the base of the bush member onto the image sensing module and adjusting an angle between the base and the image sensing module such that the reading line of the image sensing module is arranged in a second direction.

In an embodiment, the first direction is a scanning direction, and the second direction is perpendicular to the first direction.

In an embodiment, the image sensing module includes a charge-couple device for sensing the electronic signal of the image.

In an embodiment, the bushing body is a hollow cylinder made of metallic material.

Preferably, the metallic material is copper.

In an embodiment, the base of the bush member is made of plastic material.

In an embodiment, the fixing and adjusting member includes at least two screws penetrating through corresponding first bolt holes of the base and then secured to the corresponding second bolt holes in the image sensing module, thereby fixing the base of the bush member onto the image sensing module.

In an embodiment, the angle between the base of the bush member and the image sensing module is adjustable by rotating the screws such that the reading line of the image sensing module is arranged in a second direction.

In accordance with a second aspect of the present invention, there is provided a reading-line adjusting device of an image scanner. The reading-line adjusting device comprises an image sensing module, a shaft, a bush member, and a fixing and adjusting member. The image sensing module has a reading line for sensing an electronic signal of an image. The shaft is arranged in a scanning direction. The bush member comprises a base and a bushing body. The base is coupled with the image sensing module. The bushing body is sleeved around the shaft and moved along the shaft. The fixing and adjusting member is used for fixing the base of the bush member onto the image sensing module and adjusting an angle between the base and the image sensing module such that the reading line of the image sensing module is arranged in a direction perpendicular to the scanning direction.

In accordance with a third aspect of the present invention, there is provided a method for adjusting a reading line of an image scanner. The method comprises the steps of: (a) providing a reading-line adjusting device, wherein the reading-line adjusting device comprises: an image sensing module; a shaft arranged in a scanning direction; a bush member comprising a base coupled with the image sensing module, and a bushing body sleeved around the shaft and moved along the shaft; and a fixing and adjusting member for fixing the base of the bush member onto the image sensing module; and (b) adjusting an angle between the base and the image sensing module via the fixing and adjusting member such that the reading line of the image sensing module is arranged in a direction perpendicular to the scanning direction.

The above objects and advantages of the present invention will become more readily apparent to those ordinarily skilled

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
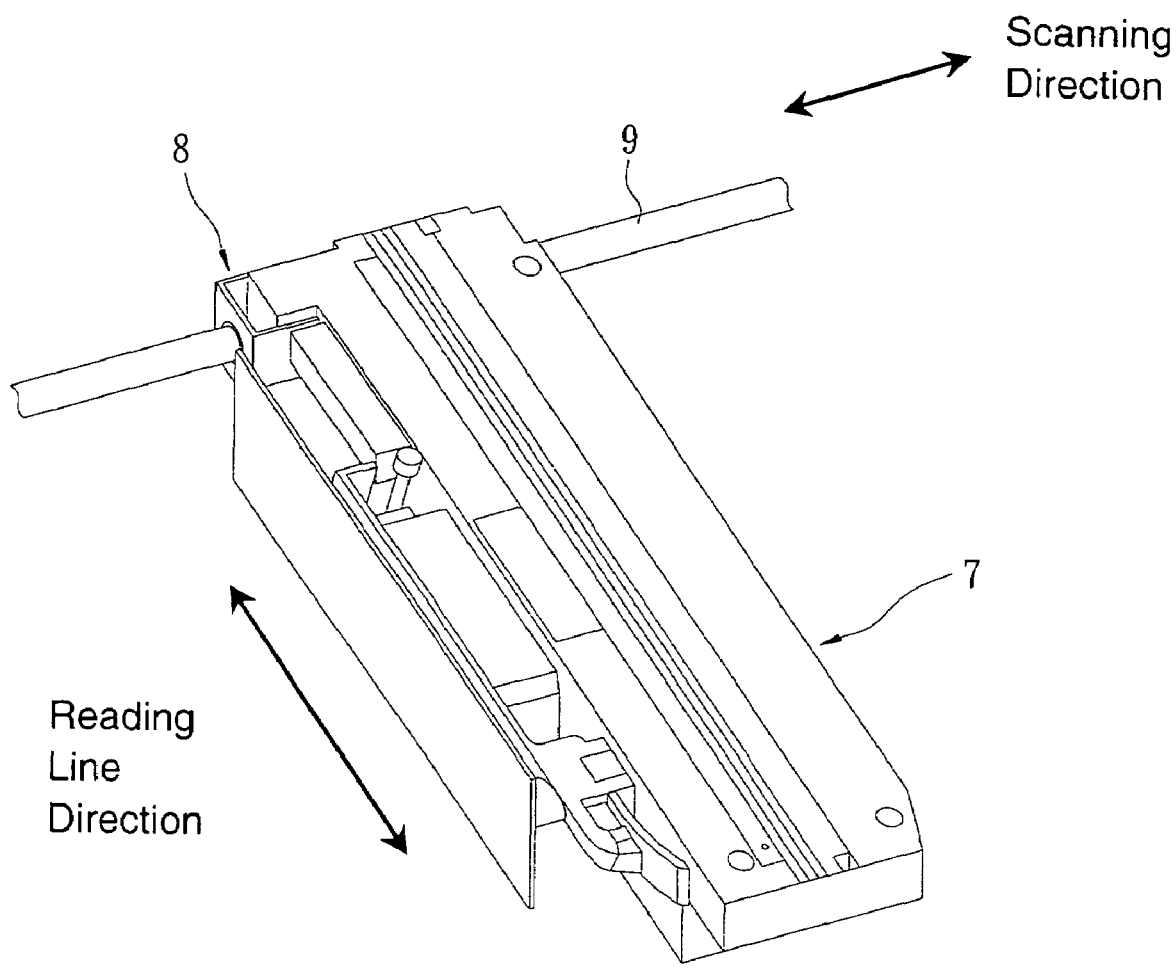
FIG. 1 is a schematic perspective view illustrating an image sensing module moved along a shaft according to prior art.
Figure 2:
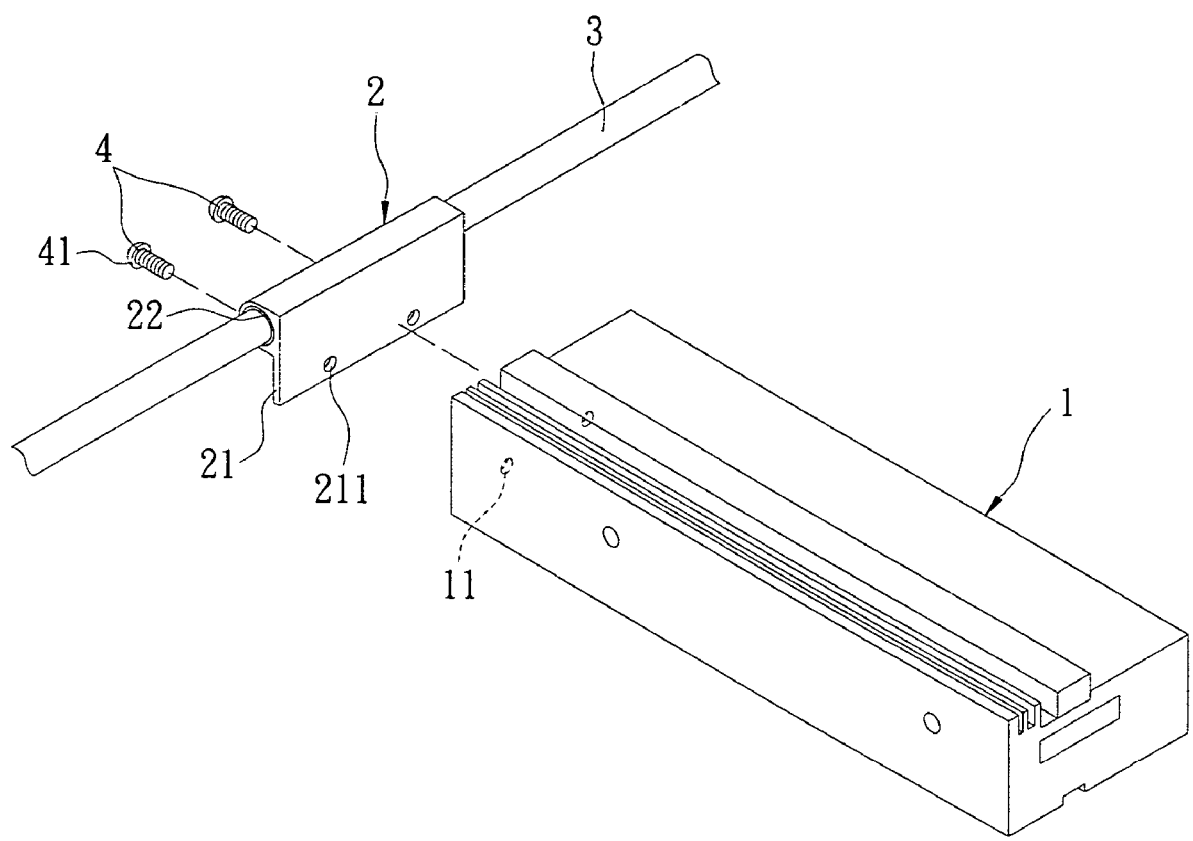
FIG. 2 is a schematic exploded view illustrating a reading-line adjusting device of an image scanner according to a preferred embodiment of the present invention.
Figure 3:
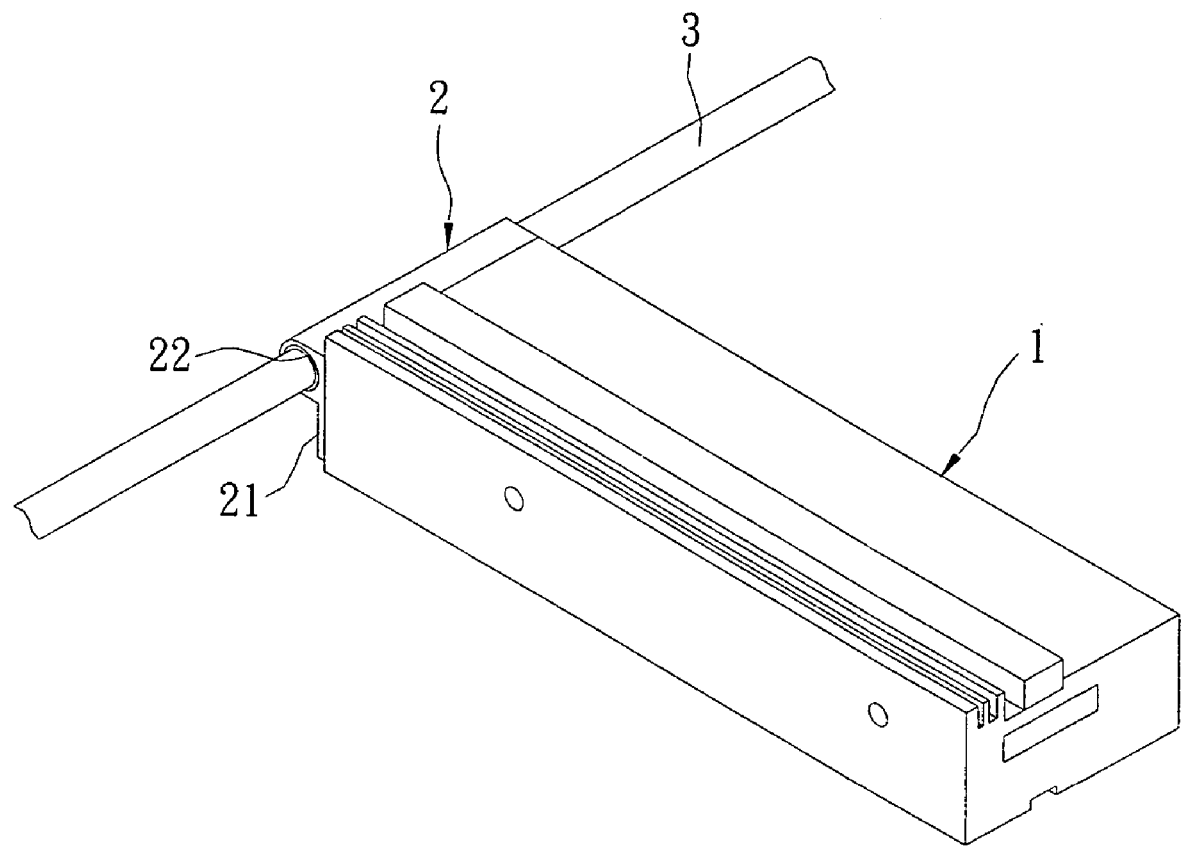
FIG. 3 is a schematic assembled view illustrating the reading-line adjusting device of FIG. 2.
Figure 4:
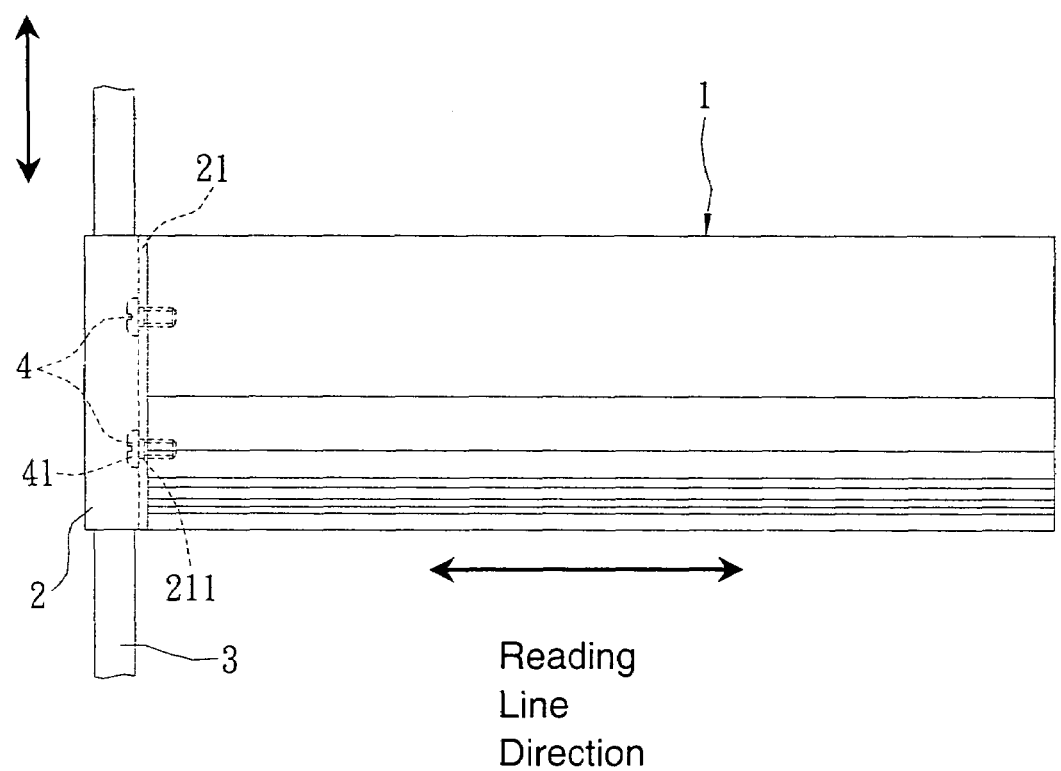
FIG. 4 is a schematic plan view illustrating the reading-line adjusting device of FIG. 3.

Referring to FIGS. 2, 3 and 4, a reading-line adjusting device according to a preferred embodiment of the present invention is shown. The reading-line adjusting device principally comprises an image sensing module 1, a bush member 2, a shaft 3 and a fixing and adjusting member 4.

The image sensing module 1 has therein several optical elements including a light source, a reflective mirror, a lens set, and a photoelectric conversion device such as a charge couple device (CCD). The functions of the reflective mirror, the lens set and the CCD element are similar to those described above and are not intended to be described redundantly herein.

As previously described, the bush member and the image sensing module are integrally formed in the prior art, and thus reading line direction is deviated from the ideal direction due to an inherent fit tolerance. For a purpose to overcome the problem occurred in the prior art, in accordance with the present invention, the bush member 2 is detachable from the image sensing module 1. The bush member 2 comprises a base 21 and a bushing body 22. The base 21 is made of plastic material and coupled with the image sensing module 1. The bushing body 22 is a hollow cylinder and made of metallic material such as copper. The bushing body 22 is sleeved around the shaft 3 and moved along the shaft 3.

The fixing and adjusting member 4 includes two screws 41. These screws 41 penetrate through corresponding first bolt holes 211 of the base 21 and are then secured to the corresponding second bolt holes 11 in the image sensing module 1, thereby fixing the base 21 of the bush member 2 onto the image sensing module 1. By properly rotating the screws 41, the angle between the base 21 of the bush member 2 and the image sensing module 1 is adjustable, and thus the reading line direction of the image sensing module is substantially perpendicular to the scanning direction.

Figure 5:
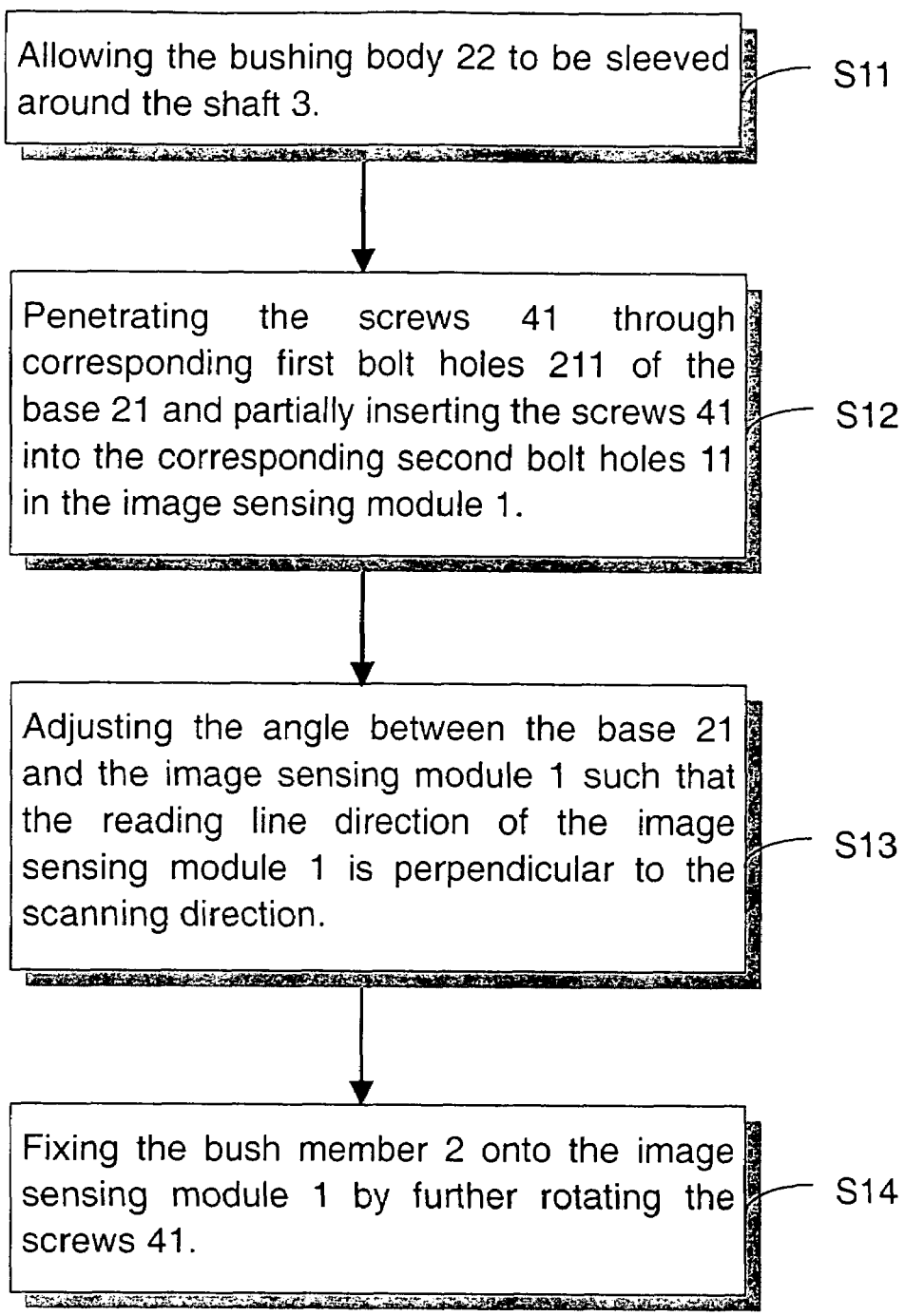
FIG. 5 is a flowchart illustrating a process for assembling the reading-line adjusting device of the present invention.

The process for assembling the reading-line adjusting device of the present invention and the reading line adjusting method will be described as follows with reference to a flowchart of FIG. 5.

Firstly, the bushing body 22 of the bush member 2 is sleeved around the shaft 3 (S11).

Then, the screws 41 penetrate through corresponding first bolt holes 211 of the base 21 and are partially inserted into the corresponding second bolt holes 11 in the image sensing module 1 (S12).

Then, the angle between the base 21 of the bush member 2 and the image sensing module 1 is adjusted according to a preliminary testing result such that the reading line direction of the image sensing module 1 is perpendicular to the scanning direction (S13).

Afterward, the respective screws 41 are rotated to be further inserted into the corresponding second bolt holes 11 so as to fix the bush member 2 onto the image sensing module 1, with a proviso that the angle determined in the previous step S13 is maintained (S14).

From the above description, the location of the image sensing module 1 relative to the shaft 3 is adjustable because the image sensing module 1 and the bush member 2 are separately produced. In such way, the reading line direction of the image sensing module 1 is adjusted to be perpendicular to the scanning direction, thereby minimizing the adverse influence resulting from the reading line direction's deviation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reading-line adjusting device of an image scanner for scanning an object on a scanning platform, said reading-line adjusting device comprising:
    an image sensing module having a reading line for sensing an electronic signal of an image;
    a shaft arranged in a first direction;
    a bush member comprising a base coupled with said image sensing module, and a bushing body sleeved around said shaft and moved along said shaft; and
    a fixing and adjusting member for fixing said base of said bush member onto one side of said image sensing module and adjusting an angle between said base and said side of said image sensing module, wherein said side of said image sensing module is perpendicular to said scanning platform, such that said reading line of said image sensing module is arranged in a second direction relative to said first direction.

2. The reading-line adjusting device according to claim 1 wherein said first direction is a scanning direction.

3. The reading-line adjusting device according to claim 1 wherein said second direction is perpendicular to said first direction.

4. The reading-line adjusting device according to claim 1 wherein said image sensing module includes a charge-couple device for sensing said electronic signal of said image.

5. The reading-line adjusting device according to claim 1 wherein said bushing body is a hollow cylinder made of metallic material.

6. The reading-line adjusting device according to claim 5 wherein said metallic material is copper.

7. The reading-line adjusting device according to claim 1 wherein said base of said bush member is made of plastic material.

8. The reading-line adjusting device according to claim 1 wherein said fixing and adjusting member includes at least two screws penetrating through corresponding first bolt holes of said base and then secured to corresponding second bolt holes in said side of said image sensing module, thereby fixing said base of said bush member onto said side of said image sensing module.

9. The reading-line adjusting device according to claim 8 wherein said angle between said base of said bush member and said side of said image sensing module is adjustable by rotating said screws such that said reading line of said image sensing module is arranged in a second direction relative to said first direction.

10. A reading-line adjusting device of an image scanner for scanning an object on a scanning platform, said reading-line adjusting device comprising:
    an image sensing module having a reading line for sensing an electronic signal of an image;
    a shaft arranged in a scanning direction;
    a bush member comprising a base coupled with said image sensing module, and a bushing body sleeved around said shaft and moved along said shaft; and
    a fixing and adjusting member for fixing said base of said bush member onto one side of said image sensing module and adjusting an angle between said base and said side of said image sensing module, wherein said side of said image sensing module is perpendicular to said scanning platform, such that said reading line of said image sensing module is arranged in a direction perpendicular to said scanning direction.

11. The reading-line adjusting device according to claim 10 wherein said image sensing module includes a charge-couple device for sensing said electronic signal of said image.

12. The reading-line adjusting device according to claim 10 wherein said bushing body is a hollow cylinder made of metallic material.

13. The reading-line adjusting device according to claim 12 wherein said metallic material is copper.

14. The reading-line adjusting device according to claim 10 wherein said base of said bush member is made of plastic material.

15. The reading-line adjusting device according to claim 10 wherein said fixing and adjusting member includes at least two screws penetrating through corresponding first bolt holes of said base and then secured to corresponding second bolt holes in said side of said image sensing module, thereby fixing said base of said bush member onto said side of said image sensing module.

16. The reading-line adjusting device according to claim 15 wherein said angle between said base of said bush member and said side of said image sensing module is adjustable by rotating said screws such that said reading line of said image sensing module is arranged in a direction perpendicular to said scanning direction.

17. A method for adjusting a reading line of an image scanner for scanning an object on a scanning platform, comprising the steps of:
    (a) providing a reading-line adjusting device, wherein said reading-line adjusting device comprises:
    an image sensing module;
    a shaft arranged in a scanning direction;
    a bush member comprising a base coupled with said image sensing module, and a bushing body sleeved around said shaft and moved along said shaft; and
    a fixing and adjusting member for fixing said base of said bush member onto one side of said image sensing module, wherein said side of said image sensing module is perpendicular to said scanning platform; and
    (b) adjusting an angle between said base and said side of said image sensing module via said fixing and adjusting member such that said reading line of said image sensing module is arranged in a direction perpendicular to said scanning direction.

18. The method according to claim 17 wherein said fixing and adjusting member includes at least two screws penetrating through corresponding first bolt holes of said base and then secured to corresponding second bolt holes in said side of said image sensing module, thereby fixing said base of said bush member onto said side of said image sensing module.

19. The method according to claim 17 wherein said angle between said base of said bush member and said side of said image sensing module is adjustable by rotating said screws such that said reading line of said image sensing module is arranged in a direction perpendicular to said scanning direction.

20. The method according to claim 17 wherein said image sensing module includes a charge-couple device for sensing an electronic signal of an image.

\* \* \* \* \*